(12) United States Patent
Luo et al.

(10) Patent No.: US 8,989,234 B2
(45) Date of Patent: Mar. 24, 2015

(54) METHOD AND DEVICE FOR SIGNAL PROCESSING IN SPREAD SPECTRUM SYSTEM

(71) Applicant: Huawei Technologies Co., Ltd., Shenzhen (CN)

(72) Inventors: Xiaojun Luo, Shenzhen (CN); Hui Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/190,752

(22) Filed: Feb. 26, 2014

(65) Prior Publication Data

US 2014/0177677 A1    Jun. 26, 2014

Related U.S. Application Data

(63) Continuation of application No. PCT/CN2012/080919, filed on Sep. 3, 2012.

(30) Foreign Application Priority Data

Sep. 7, 2011  (CN) .......................... 2011 1 0264020

(51) Int. Cl.
*H04B 1/00* (2006.01)
*H04B 1/692* (2011.01)
*H04B 1/71* (2011.01)

(52) U.S. Cl.
CPC .................. *H04B 1/692* (2013.01); *H04B 1/71* (2013.01); *H04B 1/7102* (2013.01)
USPC ........................................................ 375/147

(58) Field of Classification Search
USPC .......... 375/130, 140, 142, 147, 150; 370/206, 370/210
See application file for complete search history.

(56) References Cited

U.S. PATENT DOCUMENTS

| 5,271,038 | A | | 12/1993 | Cai | |
| 5,307,376 | A | * | 4/1994 | Castelain et al. | ............. 375/260 |
| 5,410,750 | A | * | 4/1995 | Cantwell et al. | ............. 455/306 |
| 5,953,365 | A | | 9/1999 | Badke | |
| 7,263,140 | B2 | * | 8/2007 | Henttu | .......................... 375/340 |
| 7,366,243 | B1 | * | 4/2008 | McCrady | ..................... 375/259 |

(Continued)

FOREIGN PATENT DOCUMENTS

| CN | 1909383 A | 2/2007 |
| CN | 101112001 A | 1/2008 |

(Continued)

*Primary Examiner* — Jean B Corrielus
(74) *Attorney, Agent, or Firm* — Brinks Gilson & Lione

(57) ABSTRACT

A method and a device for signal processing in a communication system are provided. The method includes: performing sampling and time-frequency transform on a received first time domain signal to obtain a first frequency domain signal; performing modulus operation on the first frequency domain signal with respect to a preset threshold to obtain a second frequency domain signal; performing inverse time-frequency transform on the second frequency domain signal to obtain a second time domain signal, and performing despreading on the second time domain signal. The embodiments of the present invention can avoid the problem in the prior art that not only the NBI signal but also the SS signal which is a useful signal are filtered out, which results from frequency domain signals of a certain number of frequency points being set to zero, and thereby improve the reliability of signal reception.

8 Claims, 2 Drawing Sheets

(56) References Cited

U.S. PATENT DOCUMENTS

| | | | |
|---|---|---|---|
| 7,792,184 B2* | 9/2010 | Smee et al. | 375/232 |
| 8,098,765 B1* | 1/2012 | Beckmann et al. | 375/316 |
| 8,170,089 B2* | 5/2012 | Park et al. | 375/229 |
| 2002/0094022 A1 | 7/2002 | Bially et al. | |
| 2006/0140316 A1 | 6/2006 | Bobkov et al. | |
| 2007/0244669 A1* | 10/2007 | Vogel et al. | 702/190 |
| 2008/0279256 A1 | 11/2008 | Zhao et al. | |
| 2008/0304553 A1 | 12/2008 | Zhao et al. | |
| 2009/0323779 A1* | 12/2009 | Lennen | 375/148 |
| 2010/0246637 A1* | 9/2010 | Miyatani | 375/130 |
| 2011/0228815 A1* | 9/2011 | Nakamura et al. | 375/130 |
| 2011/0235761 A1* | 9/2011 | Oren | 375/350 |
| 2011/0243197 A1* | 10/2011 | Atarashi et al. | 375/146 |
| 2012/0026031 A1* | 2/2012 | Goodman | 342/159 |

FOREIGN PATENT DOCUMENTS

| | | |
|---|---|---|
| CN | 101112003 A | 1/2008 |
| CN | 101197582 A | 6/2008 |
| CN | 101841349 A | 9/2010 |
| EP | 1962433 A1 | 8/2008 |

* cited by examiner

METHOD AND DEVICE FOR SIGNAL PROCESSING IN SPREAD SPECTRUM SYSTEM

CROSS-REFERENCE TO RELATED APPLICATIONS

The application is a continuation of International Application No. PCT/CN2012/080919, filed on Sep. 3, 2012, which claims priority to Chinese Patent Application No. 201110264020.6, filed on Sep. 7, 2011, both of which are hereby incorporated by reference in their entireties.

TECHNICAL FIELD

Embodiments of the present invention relate to the field of communication technologies, in particular to a method and a device for signal processing in a spread spectrum system.

BACKGROUND

Spread spectrum system performs data transmission by using a frequency band with its bandwidth much greater than information bandwidth, has advantages of anti narrow band interference, anti multi-path fading, good security, high spectrum efficiency and being applicable to cellular networks, and becomes a widely used class of wireless communication technology. For example, in wideband code division multiple access (Wideband Code Division Multiple Access, referred to as WCDMA) system, a receiving end device can adopt a transform domain suppression mode to suppress narrowband interference (Narrow Band Interference, referred to as NBI) signal.

In prior art, according to bandwidth and strength of a NBI signal, a receiving end device can obtain the number, 2M, of the frequency points which are to be set to zero in frequency domain signals obtained by transforming sample data, then the frequency domain signals at left M frequency points and right M frequency points around a detected interference central point are set to zero, and then despreading is performed to a time domain signal obtained from transform.

However, the transform domain suppression mode in prior art sets the frequency domain signals at the 2M frequency points to zero, which not only filter out the NBI signal, but also filter out the useful spread spectrum (Spread Spectrum, referred to as SS) signal, thereby reduces the reliability of signal reception.

SUMMARY

The embodiment of the present invention provides a method and a device for signal processing in a communication system, so as to improve the reliability of signal reception.

One aspect of the present invention provides a method for signal processing in a communication system, the method includes:

performing sampling and time-frequency transform to a received first time domain signal, to obtain a corresponding first frequency domain signal;

performing modulus operation on the first frequency domain signal with respect to a preset threshold, to obtain a second frequency domain signal;

performing inverse time-frequency transform to the second frequency domain signal to obtain a corresponding second time domain signal, and performing despreading to the second time domain signal.

Another aspect of the present invention provides a device for signal processing in a communication system, the device includes:

a transform unit, configured to perform sampling and time-frequency transform to a received first time domain signal to obtain a corresponding first frequency domain signal;

a modulus unit, configured to perform modulus operation on the first frequency domain signal with respect to a preset threshold to obtain a second frequency domain signal;

a processing unit, configured to perform inverse time-frequency transform to the second frequency domain signal to obtain a corresponding second time domain signal, and performing despreading to the second time domain signal.

From the above technical solutions, it can be seen that, the embodiments of the present invention perform modulus operation on the first frequency signal obtained through sampling and time-frequency transform, with respect to a preset threshold, to obtain the second frequency domain signal, can avoid the problem in the prior art that not only the NBI signal but also the SS signal which is a useful signal are filtered out, which results from frequency domain signals at a certain number of frequency points being set zero, and thereby improve the reliability of signal reception.

BRIEF DESCRIPTION OF THE DRAWINGS

To illustrate the technical solutions of embodiments of the present invention or in the prior art more clearly, the accompanying drawings required for describing the embodiments or the prior art are introduced below briefly. Apparently, the accompanying drawings in the following descriptions are only some embodiments of the present invention, persons of ordinary skill in the art can obtain other drawings according to these accompanying drawings without creative efforts.

DETAILED DESCRIPTION

In order to make the objective, technical solutions and advantages of embodiments of the present invention more clearly, the technical solutions of the embodiments of the present invention will be described more clearly and completely in combination with the drawings of the embodiments of the present invention. Obviously, the embodiments described are part of the embodiments of the present invention but not all of the embodiments. Based on the embodiments of the present invention, all other embodiments obtained by those skilled in the art without creative work are within the protection scope of the present invention.

Figure 1:
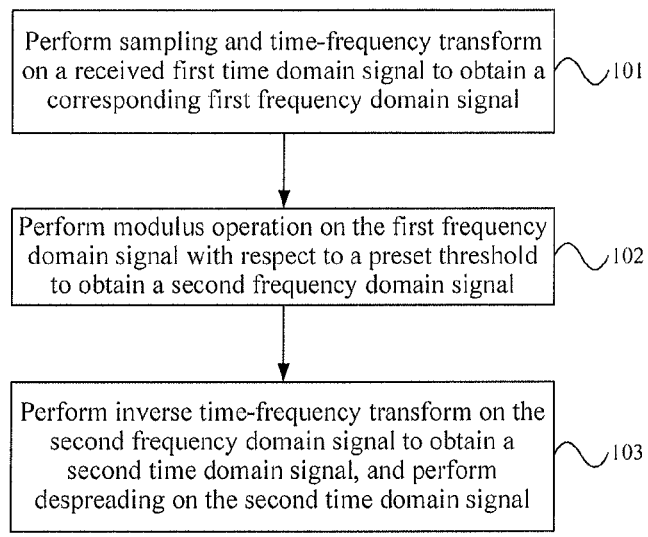
FIG. 1 is a schematic flow diagram of a method for signal processing provided by an embodiment of the present invention.

FIG. 1 is a schematic flow diagram of a method for signal processing provided by an embodiment of the present invention, as shown in FIG. 1, the method for signal processing provided by the present embodiment can include:

101, perform sampling and time-frequency transform on a received first time domain signal to obtain a corresponding first frequency domain signal;

Specifically, at first, sampling can be performed at a certain sample rate on the received first time domain signal, for example: taking sample data $[r_1, r_2, r_3, \ldots, r_{N-1}, r_N]^T$ in a window with length N. Then, transform from time domain to frequency domain (i.e. time-frequency transform) is performed to obtain a corresponding frequency domain signal $[R_1, R_2, R_3, \ldots, R_{N-1}, R_N]^T$.

Where, the received first time domain signal includes a time domain SS signal, a time domain noise signal and a time domain NBI signal; correspondingly, the obtained first frequency domain signal $R_k$ at a frequency point k (i.e. the k th subcarrier) includes a frequency domain SS signal $S_k$ at the frequency point k, a frequency domain noise signal $N_k$ at the frequency point k and a frequency domain NBI signal $I_k$ at the frequency point k, that is $R_k = S_k + N_k + I_k$ (k=1, 2, ..., N).

102, perform modulus operation on the first frequency domain signal with respect to a preset threshold to obtain a second frequency domain signal.

For example: perform modulus operation $\tilde{R}_k = R_k \mod(Th)$ on the first frequency domain signal, where, $\tilde{R}_k$ is the second frequency domain signal at the frequency point k, $R_k$ is the first frequency domain signal at the frequency point k, Th is the preset threshold. For a binary frequency domain signal, the above modulus operation can be simplified as an operation of truncating lower bits.

Since the strength of the NBI signal is much greater than that of the noise signal and the SS signal, the modulus operation can filter out a majority of NBI signals with a high strength, while a vast majority of SS signals and noise signals with a lower strength will remain.

The second frequency domain signal $\tilde{R}_k$ at the frequency point k (i.e. the k th subcarrier) includes the frequency domain SS signal $\tilde{S}_k$ at the frequency point k after the modulus operation, the frequency domain noise signal $\tilde{N}_k$ at the frequency point k after the modulus operation and the frequency domain NBI signal $\tilde{I}_k$ at the frequency point k after the modulus operation, that is $\tilde{R}_k = \tilde{S}_k + \tilde{N}_k + \tilde{I}_k$ (k=1, 2, ..., N).

Furthermore, before step 102, the preset threshold can further be set, so that when there is no NBI signal, the amplitude of a third frequency domain signal obtained from a received third time domain signal through sampling and time-frequency transform, is higher than a false alarm probability of the above preset threshold, that is, the false alarm probability $P_F$ can be represented by the following equation:

$$P_F = P\{|\text{Real}\{R_k\}| > Th\} + P\{|\text{Imag}\{R_k\}| > Th\} = 2\text{erfc}\left(\frac{Th}{\sqrt{2}\,\sigma_k}\right).$$

That is to say, when there is no narrow band interference, the preset threshold Th should guarantee that frequency points with no interference will not be damaged as far as possible, that is to guarantee the false alarm probability small enough.

Take wideband code division multiple access (Wideband Code Division Multiple Access, referred to as WCDMA) system as an example, when there is no NBI signal, the obtained frequency domain signal $R_k$ at the frequency point k (i.e. the k th subcarrier) includes the frequency domain SS signal $S_k$ and the frequency domain noise signal $N_k$, that is $R_k = S_k + N_k$ (k=1, 2, ..., N). The frequency domain signal in WCDMA system is a wide spectrum signal with a uniform power spectrum density, thus the frequency domain SS signal $S_k$ can be approximately regarded as a complex Gaussian distribution, then both the real part and the imaginary part of the frequency domain signal $R_k$ at the frequency point k follow normal distribution $N(0, \sigma_k^2)$, where, $\sigma_k^2$ is the energy of the frequency domain signal $R_k$, $\sigma_k^2 = N(\sigma_s^2 + \sigma_n^2)/2$.

103, perform inverse time-frequency transform on the second frequency domain signal to obtain a corresponding second time domain signal, and perform despreading on the second time domain signal.

Where, in the despreading process, the second time domain signal can be multiplied with a spreading code (for example: pseudorandom sequence etc) used in spreading, so as to recover the signal before spreading.

Optionally, the time-frequency transform above can be Fourier transform, for example: fast Fourier transform (Fast Fourier Transform, referred to as FFT); accordingly, the inverse time-frequency transform above can be inverse Fourier transform, for example: inverse fast Fourier transform (Inverse Fast Fourier Transform, referred to as IFFT).

Optionally, the time-frequency transform above can be Laplace transform; accordingly, the inverse time-frequency transform above can be inverse Laplace transform.

Optionally, the time-frequency transform above can be Z transform; accordingly, the inverse time-frequency transform above can be inverse Z transform.

It could be understood that, the essence of the above Fourier transform, Laplace transform, Z transform is to map a time domain representation of a signal to a frequency domain representation, merely the mapping rules adopted are different, for the specific mapping rule relevant description in prior art can be referred to, and will not be described here; similarly, the essence of the corresponding Fourier transform, Laplace transform, and Z transform will also not be described.

The present embodiment and performs modulus operation on the first frequency domain signal obtained through sampling and time-frequency transform after sampling and time-frequency transform, with respect to a preset threshold, to obtain the second frequency domain signal, can avoid the problem in the prior art that not only the NBI signal but also the SS signal which is a useful signal are filtered out, which results from frequency domain signals of a certain number of frequency points being set to zero, and thereby improves the reliability of signal reception.

In order to further illustrate the technical effect of the method for signal processing provided by the embodiment of the present invention, the performance of NBI signal suppression in a WCDMA system is tested in the downlink of the WCDMA system. The test WCDMA system is established according to WCDMA standards, a device at a receiving end performs 2 times oversampling on the received signal, the bandwidth is 3.84×2 MHz. The frame length of the signal in the WCDMA system is 10 ms, the spread spectrum ratio is 4, and a 1/3 Turbo coding is adopted. The NBI signal is modeled as a signal of global system for mobile communications (Global System for Mobile Communications, referred to as GSM), the bandwidth is 200 kHz, the distance between the central frequency of the interference and the central frequency of WCDMA is set as 0 MHz, the channel is an additive white Gaussian noise (Additive White Gaussian Noise, referred to as AWGN) channel, the interference to noise ratio (Interference to Noise Ratio, referred to as INR) is set to 25 dB. The length of the data segment (i.e. the size of FFT window) processed by the device at the receiving end is N=256, the method for signal processing provided by the embodiment of the present invention is adopted to process the signal so as to suppress the NBI signal.

Figure 2:
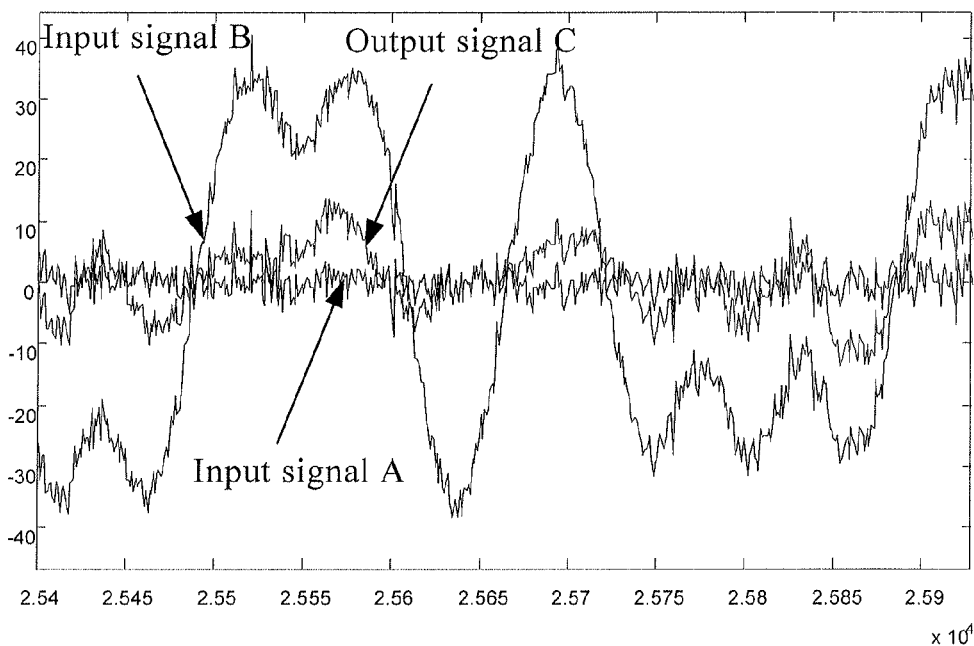
FIG. 2 is a schematic comparison diagram of input and output waveforms of a device at a receiving end in a test WCDMA system.

FIG. 2 is a schematic comparison diagram of input and output waveforms of the device at the receiving end in the test WCDMA system, the input signal A is a superposition of a signal of the WCDMA system and a white Gaussian noise signal, the input signal B is a superposition of a signal of the GSM system, a signal of the WCDMA system and a white Gaussian noise signal, the output signal C is a signal after processing by adopting the method for signal processing provided by the embodiment of the present invention. It can be seen from FIG. 2 that the NBI signal is suppressed by a large margin.

It should be noted that, for ease of description, the method embodiments above are described as a combination of a series of operations, and those skilled in the art should know that the order of operations described herein shall not be construed as limitation on the present invention because certain steps may occur in different order or occur simultaneously according to the present invention. Also, it should be understood that the embodiments described in the description belong to preferred embodiments, so the associated operations and modules are not necessary for the present invention.

In the foregoing embodiments, each embodiment emphasizes on a specific aspect, and for the part not detailed in one embodiment, relevant description in other embodiment can be referred to.

Figure 3:
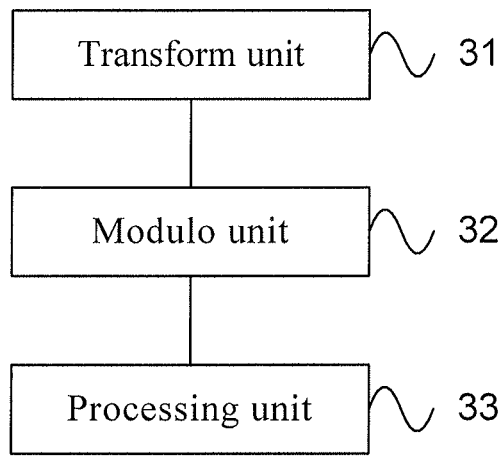
FIG. 3 is a schematic structural diagram of a device for signal processing provided by another embodiment of the present invention.

FIG. 3 is a schematic structural diagram of a device for signal processing provided by another embodiment of the present invention, as shown in FIG. 3, the device for signal processing provided by the present embodiment can include a transform unit 31, a modulo unit 32 and a processing unit 33.

Where the transform unit 31 is configured to perform sampling and time-frequency transform on a received first time domain signal, to obtain a corresponding first frequency domain signal; specifically: the first frequency domain signal received by the transform unit 31 includes a time domain spread spectrum SS signal, a time domain noise signal and a time domain narrow band interference NBI signal, the obtained first frequency domain signal $R_k$ at a corresponding frequency point k includes a frequency domain SS signal $S_k$ at the frequency point k, a frequency domain noise signal $N_k$ at the frequency point k and a frequency domain NBI signal $I_k$ at frequency point k, $R_k=S_k+N_k+I_k$ (k=1, 2, ..., N).

The modulo unit 32 is configured to perform modulus operation on the above first frequency domain signal obtained by the transform unit 31 with respect to a preset threshold, to obtain a second frequency domain signal; specifically: the modulo unit 32 performs the modulus operation $\tilde{R}_k=R_k$ mod (Th) on the first frequency domain signal, where $\tilde{R}_k$ is the second frequency domain signal at the frequency point k, $R_k$ is the first frequency domain signal at the frequency point k, Th is the preset threshold.

The processing unit 33 is configured to perform inverse time-frequency transform on the above second frequency domain signal obtained by the modulo unit 32, to obtain a corresponding second time domain signal, and perform despreading on the second time domain signal.

The time-frequency transform performed by the transform unit 31 above is Fourier transform; the inverse time-frequency transform performed by the processing unit 33 above is inverse Fourier transform; or the time-frequency transform performed by the transform unit 31 above is Laplace transform; the inverse time-frequency transform performed by the processing unit 33 above is inverse Laplace transform; or the time-frequency transform performed by the transform unit 31 above is Z transform; the inverse time-frequency transform performed by the processing unit 33 above is inverse Z transform.

The method in the embodiment corresponding to FIG. 1 can be implemented by the device for signal processing provided by the present embodiment.

Figure 4:
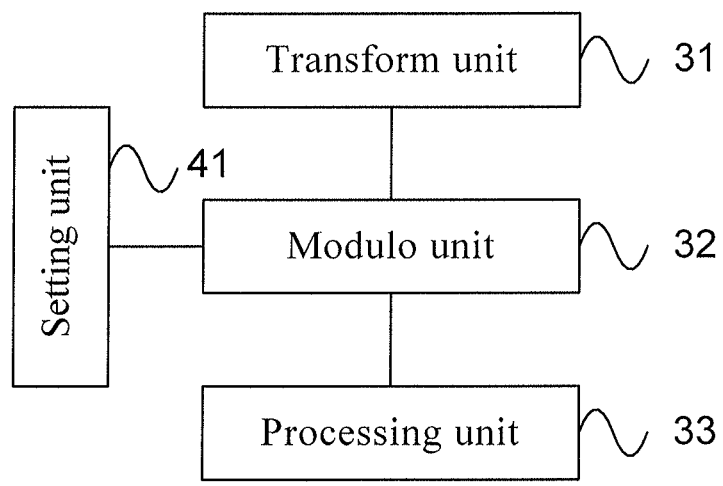
FIG. 4 is a schematic structural diagram of a device for signal processing provided by another embodiment of the present invention.

Furthermore, as shown in FIG. 4, the device for signal processing provided by the present embodiment can further include a setting unit 41, configured to set the preset threshold above, so that when there is no NBI signal, the amplitude of a third frequency domain signal obtained from sampling and time-frequency transform of a received third time domain signal, is higher than the false alarm probability of the preset threshold, where the false alarm probability is $$P_F = P\{|\text{Real}\{R_k\}| > Th\} + P\{|\text{Imag}\{R_k\}| > Th\} = 2\text{erfc}\left(\frac{Th}{\sqrt{2}\,\sigma_k}\right).$$

In the present embodiment, the modulo unit 32 performs modulus operation, with respect to the preset threshold, on the first frequency signal obtained by the transform unit 31 through sampling and time-frequency transform, to obtain the second frequency domain signal, which can avoid the problem in the prior art that not only the NBI signal but also the SS signal which is a useful signal are filtered out, which results from frequency domain signals of a certain number of frequency points being set zero, and thereby improve the reliability of signal reception.

It could be clearly understood by those skilled in the art that, for convenience and brevity of description, the corresponding procedures in the aforementioned method embodiments can be referred to for the detailed working procedures of the systems, devices, and units described above, and will not be repeated herein.

It should be understood that, in the embodiments provided in the present application, the disclosed systems, devices and methods may be implemented in other modes. For example, the device embodiment described above is only illustrative in nature. For example, division of the units is defined from the perspective of logical functions only and may be defined in a different way in practical application. For example, multiple units or components may be combined or integrated into another system, or some features are omissible or not executed. Besides, the coupling, direct coupling or communication connection between each other illustrated or discussed herein may be implemented through interfaces, or indirect coupling or communication connection between devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention.

Besides, all functional units in the embodiments of the present invention may be physically stand-alone, or integrated into a processing unit, or two or more than two units are integrated into one unit. The integrated unit above may be implemented in form of hardware, or in form of hardware with software function units.

The integrated unit implemented in form of software function units can be stored in a computer-readable storage medium. The software function units are stored in a storage medium, comprising a number of instructions for a computer device (which can be a personal computer, a server, or a network device etc) to execute part of the steps of the method described in above embodiments of the present invention. The storage medium includes various kinds of medium capable of storing program codes, such as USB flash disk, mobile hard disk, read-only memory (Read-Only Memory, abbreviated as ROM), random access memory (Random Access Memory, abbreviated as RAM), magnetic disk, optical disk etc.

Finally, it should be noted that the above embodiments are merely provided for describing the technical solutions of the present invention, but not intend to limit the present invention. Although the present invention has been described in detail with reference to the foregoing embodiments, it should be understood by those of ordinary skill in the art that modifications can be made to the technical solutions described in the foregoing embodiments, or equivalent replacements can be made to some technical features in the technical solutions; such modifications or replacements do not cause the essence of corresponding technical solutions to depart from the scope of the present invention.

What is claimed is:

1. A method for signal processing in a communication system, comprising:
   performing sampling and time-frequency transform on a received first time domain signal to obtain a first frequency domain signal;
   performing modulus operation on the first frequency domain signal with respect to a preset threshold to obtain a second frequency domain signal;
   performing inverse time-frequency transform on the second frequency domain signal to obtain a second time domain signal, and performing despreading on the second time domain signal; and
   setting the preset threshold, so that when there is no Narrow Band Interference (NBI) signal, an amplitude of a third frequency domain signal obtained through sampling and time-frequency transform on a received third time domain signal, is higher than a false alarm probability of the preset threshold, wherein the false alarm probability is $$P_F = P\{|\text{Real}\{R_k\}| > Th\} + P\{|\text{Imag}\{R_k\}| > Th\} = 2\text{erfc}\left(\frac{Th}{\sqrt{2}\,\sigma_k}\right),$$

wherein, $R_k$ is the first frequency domain signal at the frequency point k, Th is the preset threshold, $\sigma_k^2$ is the energy of the first frequency domain signal $R_k$.

2. The method according to claim 1, wherein performing the sampling and the time-frequency transform on the received first time domain signal to obtain the first frequency domain signal specifically comprises:
   taking sample data $[r_1, r_2, r_3, \ldots, r_{N-1}, r_N]^T$, within a window with length N from the received first time domain signal and performing the time-frequency transform to obtain the corresponding first frequency domain signal $[R_1, R_2, R_3, \ldots, R_{N-1}, R_N]^T$;
   wherein, the received first time domain signal comprises a time domain spread spectrum (SS) signal, a time domain noise signal and a time domain narrow band interference (NBI) signal, the obtained first frequency domain signal $R_k$ at a corresponding frequency point k comprises a frequency domain SS signal $S_k$ at the frequency point k, a frequency domain noise signal $N_k$ at the frequency point k and a frequency domain NBI signal $I_k$ at the frequency point k, represented by $R_k = S_k + N_k + I_k$ (k=1, 2, \ldots, N).

3. The method according to claim 1, wherein, performing the modulus operation on the first frequency domain signal with respect to the preset threshold to obtain the second frequency domain signal specifically comprises:
   performing modulus operation $\tilde{R}_k = R_k \bmod (Th)$ on the first frequency domain signal, wherein, $\tilde{R}_k$ is the second frequency domain signal at the frequency point k.

4. The method according to claim 1, wherein,
   the time-frequency transform is a Fourier transform; the inverse time-frequency transform is an inverse Fourier transform; or
   the time-frequency transform is a Laplace transform; the inverse time-frequency transform is an inverse Laplace transform; or
   the time-frequency transform is a Z transform; the inverse time-frequency transform is an inverse Z transform.

5. A non-transitory computer readable medium storing program executable instructions, when executed by a processor, instructs the processor to:
   perform sampling and time-frequency transform on a received first time domain signal to obtain a first frequency domain signal;
   perform modulus operation on the first frequency domain signal with respect to a preset threshold to obtain a second frequency domain signal;
   perform inverse time-frequency transform on the second frequency domain signal to obtain a second time domain signal, and performing despreading on the second time domain signal; and
   set the preset threshold, so that when there is no Narrow Band Interference (NBI) signal, an amplitude of a third frequency domain signal obtained through sampling and time-frequency transform on a received third time domain signal, is higher than a false alarm probability of the preset threshold, wherein the false alarm probability is $$P_F = P\{|\text{Real}\{R_k\}| > Th\} + P\{|\text{Imag}\{R_k\}| > Th\} = 2\text{erfc}\left(\frac{Th}{\sqrt{2}\,\sigma_k}\right),$$

wherein, $R_k$ is the first frequency domain signal at the frequency point k, Th is the preset threshold, $\sigma_k^2$ is the energy of the first frequency domain signal $R_k$.

6. The non-transitory computer readable medium according to claim 5, wherein the modulus operation on the first frequency domain signal with respect to the preset threshold to obtain the second frequency domain signal is performed as follow:
   $\tilde{R}_k = R_k \bmod (Th)$ on the first frequency domain signal, wherein, $\tilde{R}_k$ is the second frequency domain signal at the frequency point k.

7. The non-transitory computer readable medium according to claim 5, wherein,
   the time-frequency transform is a Fourier transform; the inverse time-frequency transform is an inverse Fourier transform; or
   the time-frequency transform is a Laplace transform; the inverse time-frequency transform is an inverse Laplace transform; or
   the time-frequency transform is a Z transform; the inverse time-frequency transform is an inverse Z transform.

8. The non-transitory computer readable medium according to claim 5,
   wherein the first time domain signal comprises a time domain spread spectrum (SS) signal, a time domain noise signal and a time domain narrow band interference (NBI) signal, the first frequency domain signal, represented by $R_k$, at a corresponding frequency point k comprises a frequency domain SS signal $S_k$ at the frequency point k, a frequency domain noise signal $N_k$ at the frequency point k and a frequency domain NBI signal $I_k$ at the frequency point k, such that $R_k = S_k + N_k + I_k$ (k=1, 2, ..., N).

* * * * *